Figure 1:
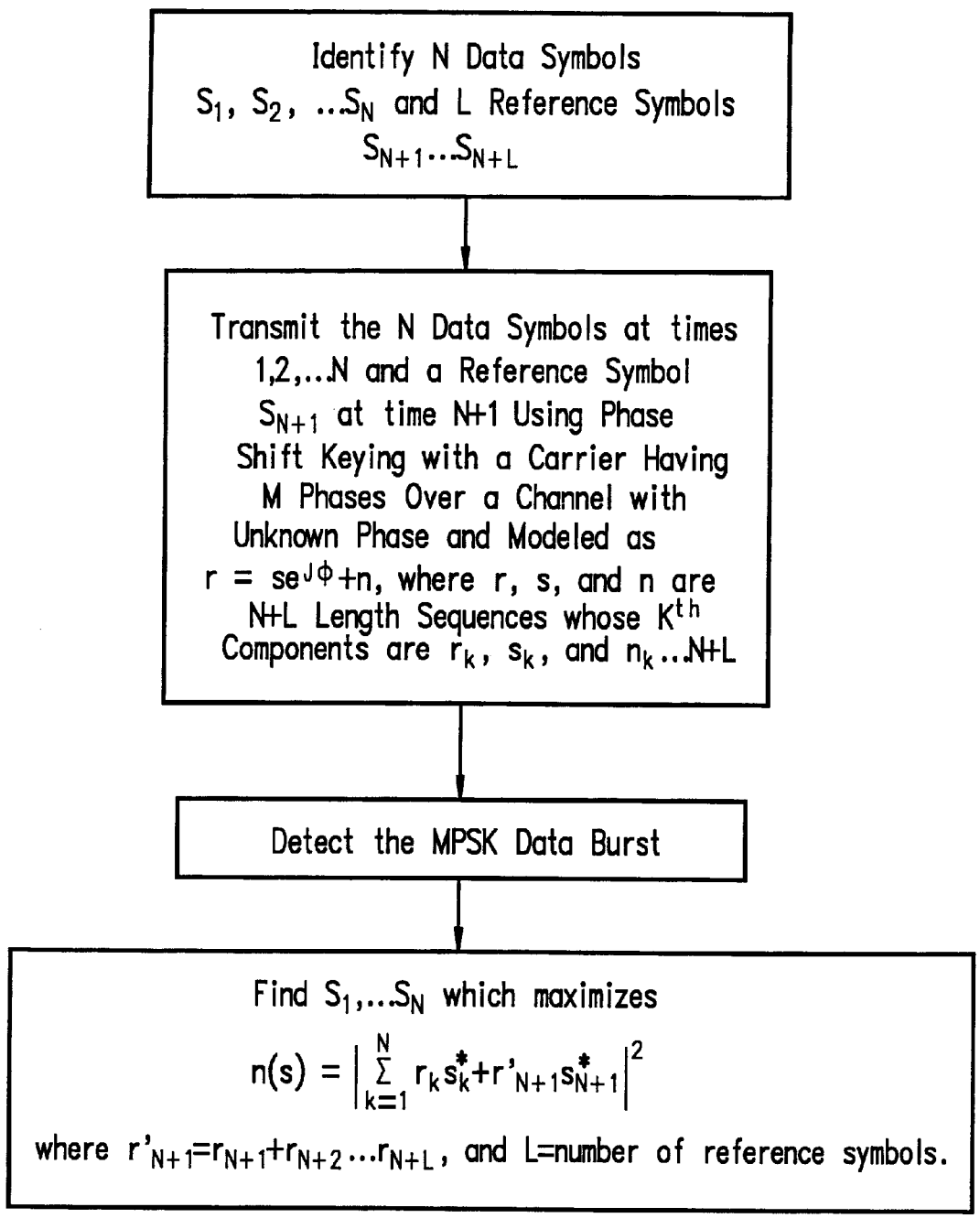

United States Patent [19]
Mackenthun

[11] Patent Number: 5,940,446
[45] Date of Patent: Aug. 17, 1999

[54] MAXIMUM LIKELIHOOD DETECTION OF MPSK BURSTS WITH INSERTED REFERENCE SYMBOLS

[75] Inventor: Ken Mackenthun, Santa Clara, Calif.

[73] Assignee: Stanford Telecommunications, Inc., Sunnyvale, Calif.

[21] Appl. No.: 08/847,729

[22] Filed: Apr. 28, 1997

[51] Int. Cl.[6] .................................................. H04L 27/10
[52] U.S. Cl. .......................... 375/280; 375/308; 375/332; 375/341; 329/304; 332/103
[58] Field of Search ................................ 375/262, 280, 375/281, 308, 325, 331, 332, 341; 329/304; 332/103

[56] References Cited

U.S. PATENT DOCUMENTS

| | | | |
|---|---|---|---|
| 5,619,167 | 4/1997 | Adachi | 329/304 |
| 5,684,832 | 11/1997 | Adachi et al. | 375/262 |
| 5,706,313 | 1/1998 | Blasiak et al. | 375/330 |
| 5,732,114 | 3/1998 | Thebault et al. | 375/368 |

OTHER PUBLICATIONS

Divsalar, D., Simon, M.K., "Multiple–Symbol Differential Detection of MPSK," IEEE Transactions on Communications, vol. 38, No. 3, Mar. 1990.

Mackenthun, K.M., Jr., "A Fast Algorithm for Multiple-–Symbol Differential Detection of MPSK," IEEE Transactions on Communications, vol. 42, No. 2/3/4, Feb./Mar./Apr. 1994.

Moher, M.L., "TCMP–A Modulation and Coding Strategy for Rician Fading Channels," IEEE Journal on Selected Areas in Communications, vol. 7, No. 9, Dec. 1989.

*Primary Examiner*—Amanda T. Le
*Attorney, Agent, or Firm*—Townsend and Townsend and Crew LLP; Henry K. Woodward

[57] ABSTRACT

A fast algorithm for performing maximum likelihood detection of data symbols transmitted as phases of a carrier signal.

6 Claims, 1 Drawing Sheet

MAXIMUM LIKELIHOOD DETECTION OF MPSK BURSTS WITH INSERTED REFERENCE SYMBOLS

BACKGROUND OF THE INVENTION

This invention relates generally to the transmission and detection of digital data using analog signals, and more particularly the invention relates to the detection of phase shift keying (PSK) encoded digital data.

The phase of a carrier signal can be used to encode digital data for transmission. The number of bits represented by a carrier phase symbol depends on the number of phases M of the carrier in an MPSK data burst.

A prior art approach to the detection of data symbols consists of using a phase locked loop to lock to the reference symbols and then detecting the data symbols using the phase reference out of the loop. A related approach is to use both reference symbols and remodulated data symbols to obtain a loop phase reference. These approaches are well known.

Another approach is to form a phase reference using a filtering operation on the reference symbols, often called pilot symbol aided demodulation. This approach is essentially the same as the phase locked loop approach in the sense that the phase locked loop also performs a filtering operation.

The present invention is concerned with maximum likelihood detection of data symbols in an MPSK data burst.

SUMMARY AND DESCRIPTION OF THE DRAWING

The present invention presents a fast algorithm to perform maximum likelihood detection of data symbols.

The FIGURE of the drawing illustrates a flow diagram of one embodiment in implementing the invention First consider a specific problem which however has all the essential features of the general problem. Consider that N data symbols $s_1, s_2, \ldots s_N$ are transmitted at times 1, 2, ... N, and that a reference symbol $S_{N+1}$ is transmitted at time N+1. All N+1 symbols are MPSK symbols, that is, for k=1, ... N, $s_k = e^{j\phi k}$, where $\phi k$ is a uniformly distributed random phase taking values in $\{0, 2\pi/M, \ldots 2\pi(M-1)/M\}$, and for k=N+1, reference symbol $S_{N+1}$ is the MPSK symbol $e^{j0}=1$. The N+1 symbols are transmitted over an AWGN channel with unknown phase, modeled by the equation:

$$r = se^{j\theta} + n. \quad 1)$$

where r, s, and n are N+1 length sequences whose $k^{th}$ components are $r_k$, $s_k$, and $n_k$, respectively, k=1, ... N+1. Further, n is the noise sequence of independent noise samples, r is the received sequence, and $\phi$ is an unknown channel phase, assumed uniformly distributed on $(-\pi, \pi]$.

We now give the maximum likelihood decision rule to recover the data $s_1, \ldots s_N$. For the moment, first consider the problem where we want to recover $s = s_1, \ldots s_{N+1}$, where $s_{N+1}$ is assumed to be unknown. We know that the maximum likelihood rule to recover s is the s which maximizes $p(r|s)$. From previous work, we know that this is equivalent to finding the s which maximizes $\eta(s)$, where:

$$\eta(s) = \left|\sum_{k=1}^{N+1} r_k s_k^*\right|^2. \quad 2)$$

In general, there are M solutions to (2). The M solutions only differ by the fact that any two solutions are a phase shift of one another by some multiple of $2\pi/M$ modulo $2\pi/M$. Now return to the original problem which is to recover the data $s_1, \ldots s_N$. The maximum likelihood estimate of $s_1, \ldots s_N$ must be the first N components of the unique one of the M solutions of (2) whose $s_{N+1}$ component is $e^{j0}=1$.

An algorithm to maximize (2) when all $S_k$, k=1, ... N+1 are unknown and differentially encoded is given in K. Mackenthun Jr., "A fast algorithm for multiple-symbol differential detection of MPSK", *IEEE Trans. Commun.*, vol 42, no. 2/3/4, pp. 1471–1474, February/March/April 1994. Therefore to find the maximum likelihood estimate of $s_1, \ldots s_N$ when $s_{N+1}$ is a reference symbol, we only need to modify the algorithm for the case when $s_{N+1}$ is known.

The modified algorithm to find the maximum likelihood estimate $\hat{s}_1, \ldots \hat{s}_N$ of $s_1, \ldots s_N$ is as follows. Let $\Phi$ be the phase vector $\Phi = (\phi_1, \ldots \phi_{N+1})$, where all $\phi_k$ can take arbitrary values, including $\phi_{N+1}$. If $|r_k|=0$, arbitrary choice of $s_k$ will maximize (2). Therefore, we may assume with no loss in generality that $|r_k|>0$, k=1, ... N. For a complex number $\gamma$, let $\arg[\gamma]$ be the angle of $\gamma$.

Let $\tilde{\Phi} = (\tilde{\phi}_1, \ldots \tilde{\phi}_{N+1})$ be the unique $\Phi$ for which:

$$\arg\{r_k e^{-j\tilde{\phi}k}\} \in [0, 2\pi/M),$$

for k=1 ... N+1.

Define $z_k$ by:

$$z_k = r_k e^{-j\tilde{\phi}k}. \quad 3)$$

For each k, k=1, ... N+1, calculate $\arg[z_k]$. List the values $\arg[z_k]$ in order, from largest to smallest. Define the function k(i) as giving the subscript k of $z_k$ for the $i^{th}$ list position, i=1, ... N+1. Thus, we have:

$$0 \le \arg[z_{k(N+1)}] \le \arg[z_{k(N)}] \le \ldots \le \arg[z_{k(1)}] < \frac{2\pi}{M}. \quad 4)$$

For i=1, ... N+1, let:

$$g_i = z_{k(i)}. \quad 5)$$

For i satisfying $N+1 \le 2(N+1)$, define:

$$g_i = e^{-j2\pi/M} g_{i-(N+1)}. \quad 6)$$

Calculate:

$$\left|\sum_{i=q}^{q+N} g_i\right|^2, \text{ for } q = 1, \ldots N+1, \quad 7)$$

and select the largest.

Suppose the largest magnitude in (7) occurs for q=q'. We now find the phase vector $\Phi + ee$ corresponding to q=q'. Using (3), (5), and (6), with i in the range of $q' \le i \le q'+N$, we have:

$$\tilde{\phi}k(i) = \tilde{\phi}k(i), q' \le i \le N+1 \quad 8)$$

$$\tilde{\phi}k(i-N) = \tilde{\phi}k\left(i-N+\frac{2\pi}{M}\right), N+1 < i \le q'+N. \quad 9)$$

The evaluation of (8) and (9) gives elements $\phi + ee_{k(l)}$, l=1, ... N+1, in order of subscript value k(l), we form the sequence $\phi + ee_1, \phi + ee_2, \ldots \phi + ee_{N+1}$, which is the vector $\Phi + ee$. The maximum likelihood estimate of $\hat{s}_1, \ldots \hat{s}_N$ is now given by $\hat{s}_k = e^{-j\hat{\phi}k}$, k=1, ... N, where $\hat{\phi}_k = \phi + ee_k - \phi + ee_{N+1}$, k=1, ... N.

As discussed in Mackenthun supra, algorithm complexity is essentially the complexity of sorting to obtain (4), which is $(N+1)\log(N+1)$ operations.

We now expand the specific problem considered earlier to a more general problem. Suppose that N data symbols are transmitted followed by L reference symbols $s_{N+1}, \ldots s_{N+L}$, where $s_k = e^{j0} = 1$ for $k = N+1, \ldots N+L$, and assume the definition of channel model (1) is expanded so that r, s, and n are N+L length sequences. Then in place of (2) we have:

$$\eta(s) = \left| \sum_{k=1}^{N+L} r_k s_k^* \right|^2. \quad 10)$$

However, note that (10) can be rewritten as:

$$\eta(s) = \left| \sum_{k=1}^{N} r_k s_k^* + r'_{N+1} s_{N+1}^* \right|^2, \quad 11)$$

where $r'_{N+1} = r_{N+1} + r_{N+2} + \ldots r_{N+L}$. But we can apply the previous modified algorithm exactly to (11) and thereby obtain a maximum likelihood estimate of the first N data symbols.

Now suppose the L reference symbols can take values other than $e^{j0}$. Since the reference symbols are known to the receiver, we can remodulate them to $e^{j0}$ and then obtain a result in the form (11), and apply the previous algorithm. Finally, suppose the L reference symbols are scattered throughout the data. It is clear that we can still obtain a result in the form (11) and apply the previous algorithm.

If desired, sorting can be avoided at the expense of an increase in complexity in the following way. Fix j, $j \in \{1, \ldots N+1\}$. For $k=1, \ldots N+1$, form $r_j^* r_k$, and let $g_{j,k}$ be the remodulation of $r_j^* r_k$ such that $g_{j,k} \in \{0, 2\pi/M\}$. Now note that the set in (7) is the same as the set:

$$\left| \sum_{k=1}^{N+1} g_{j,k} \right|^2, \text{ for } j = 1, \ldots N+1. \quad 12)$$

Thus, sorting has been eliminated but forming the above set requires $(N+1)^2$ complex multiplications.

The drawing illustrates a flow diagram of the described embodiment in implementing the algorithm for maximum likelihood detection of the MPSK data bursts.

While the invention has been described with reference to a specific embodiment, the description is illustrative of the invention and is not to be construed as limiting the invention. Various modifications and applications may occur to those skilled in the art without departing from the true spirit and scope of the invention as defined by the appended claims.

What is claimed is:

1. A method of maximum likelihood detection of data symbols in an MPSK data burst comprising the steps of:
    (a) identifying N MPSK data symbols $s_1, s_2, \ldots s_N$ at times $1, 2, \ldots N$ along with L reference symbols $S_{N+1} \ldots S_{N+L}$ at time N+1, where $s_k = e^{j\phi_k}$ for $k=1, \ldots N$, and $\phi k$ is uniformly distributed random phase taking value in $\{0, 2\pi/M, \ldots 2\pi(M-1)/M\}$, and for $k=N+1$ up to $k=N+L$ reference symbol $S_k$ is an MPSK symbol $e^{j0} = 1$;
    (b) transmitting said N MPSK symbols and L reference symbols over an AWGN channel with unknown phase and modeled as $r = se^{j\Phi} + n$, where r, s, and n are N+L length sequences whose $k^{th}$ components are $r_k$, $s_k$, and $n_k$ $k=1, \ldots N+L$; and
    (c) finding $S_1, \ldots S_N$ which maximizes:

$$\eta(s) = \left| \sum_{k=1}^{N} r_k s_k^* + r'_{N+1} s_{N+1}^* \right|^2$$

where $r'_{N+1} = r_{N+1} + r_{N+2} \ldots r_{N+L}$, and L=number of reference symbols.

2. The method as defined by claim 1, wherein step (c) includes:
    (c1) defining $\Phi$ as the phase vector $\Phi = (\phi_1, \ldots \phi_{N+1})$, and $|r_k| > 0$, $k=1, \ldots N$, and for a complex number of $\gamma$, let $\arg[\gamma]$ be the angle of $\gamma$;
    (c2) let $\Phi = (\phi_1, \ldots \phi_{N+1})$ be the unique $\Phi$ for which $$\arg[r_k e^{-j\phi k}] \in [0, 2\pi/M),$$

for $k=1, \ldots N+1$ and $$z_k = r_k e^{-j\phi k};$$

(c3) for each k, $k=1, \ldots N+1$, calculate $\arg(z_k)$, and list values in order, from largest to smallest;
    (c4) define a function k(i) as giving a subscript k of $z_k$ for the $i^{th}$ list position, $i=1, \ldots N+1$ whereby:

$$0 \leq \arg[z_{k(N+1)}] \leq \arg[z_{k(N)}] \leq \ldots \leq \arg[z_{k(1)}] < \frac{2\pi}{M}.$$

(c5) for $i=1, \ldots N+1$, let $$g_i = z_{k(i)},$$

and
for i satisfying $N+1 < i \leq 2(N+1)$, define:

$$g_i = e^{-j2\pi/M} g_{i-(N+1)};$$

and
    (c6) calculate:

$$\left| \sum_{i=q}^{q+N} g_i \right|^2, \text{ for } q = 1, \ldots N+1; \text{ and}$$

(c7) select the largest value in step (c6).

3. The method as defined by claim 2, wherein the largest value in step (c7) occurs for $q=q'$, and further including the steps of:
    (d) finding a phase vector $\Phi+ee$ corresponding to $q=q'$ as follows:

$$\tilde{\phi}k(i) = \tilde{\phi}k(i), \, q' \leq i \leq N+1$$

$$\tilde{\phi}k(i-N) = \tilde{\phi}k\left(i - N + \frac{2\pi}{M}\right), N+1 < i \leq q' + N.$$

4. The method as defined by claim 3, wherein step (d) includes arranging elements $\phi+ee_{k(l)}$, $l=1, \ldots N+1$, in order of subscript value k(l), and forming the sequence $\phi+ee_1$, $\phi+ee_2, \ldots \phi+ee_{N+1}$, as the vector $\phi+ee$, the maximum likelihood sequence $\hat{s}_1, \ldots \hat{s}_N$ being $\hat{s}_k = e^{-j\phi k}$, $k=1, \ldots N$, where $\hat{\phi}_k = \phi+ee_k - \phi+ee_{N+1}$, $k=1, \ldots N$.

5. The method as defined by claim 4, wherein N data symbols are transmitted followed by L reference symbols $s_{N+1}, \ldots s_{N+L}$, where $s_k = e^{j0} = 1$ for $k = N+1, \ldots N+L$, and r, s, and n are N+L length sequences.

6. The method as defined by claim 5, wherein j is fixed, $j \in \{1, \ldots N+1\}$ and for $k=1, \ldots N+1$, form $r_j^* r_k$, and let $g_{j,k}$ be the remodulation of $r_j^* r_k$ such that $g_{j,k} \in \{0, 2\pi/M\}$ and step c6) becomes:

$$\left| \sum_{k=1}^{N+1} g_{j,k} \right|^2, \text{ for } j = 1, \ldots N+1.$$

\* \* \* \* \*